(12) United States Patent
Treadway et al.

(10) Patent No.: US 11,427,094 B2
(45) Date of Patent: Aug. 30, 2022

(54) PRIORITIZATION FOR CHARGING ELECTRIC VEHICLES WHILE DRIVING ON THE ROAD

(71) Applicant: Kyndryl, Inc., New York, NY (US)

(72) Inventors: Michael Treadway, Keller, TX (US); Craig M. Trim, Ventura, CA (US); Chen Liang, Dublin (IE); Shikhar Kwatra, Durham, NC (US); Jeremy R. Fox, Georgetown, TX (US); Joseph Blee, Virginia (IE)

(73) Assignee: Kyndryl, Inc., New York, NY (US)

( * ) Notice: Subject to any disclaimer, the term of this patent is extended or adjusted under 35 U.S.C. 154(b) by 81 days.

(21) Appl. No.: 16/830,596

(22) Filed: Mar. 26, 2020

(65) Prior Publication Data

US 2021/0300189 A1 Sep. 30, 2021

(51) Int. Cl.
*B60L 53/12* (2019.01)
*B60L 58/12* (2019.01)
(Continued)

(52) U.S. Cl.
CPC ............... *B60L 53/12* (2019.02); *B60L 58/12* (2019.02); *B60L 58/21* (2019.02); *H04W 4/46* (2018.02)

(58) Field of Classification Search
CPC .......... B60L 53/12; B60L 58/12; B60L 58/21; B60L 2240/68; B60L 2260/54;
(Continued)

(56) References Cited

U.S. PATENT DOCUMENTS

| 8,502,500 | B2 * | 8/2013 | Baxter | B60L 53/67 |
| | | | | 320/109 |
| 9,362,761 | B2 * | 6/2016 | Appelbaum | H02J 7/007 |

(Continued)

FOREIGN PATENT DOCUMENTS

| CN | 104240495 A | * 12/2014 | |
| CN | 110194072 A | * 9/2019 | ............ B60L 53/665 |

(Continued)

OTHER PUBLICATIONS

Afridi, "Wireless Charging of Electric Vehicles", Frontiers of Engineering, Reports on Leading-Edge Engineering from the 2017 Symposium, Washington (DC), National Academies Press (US), Jan. 22, 2018, 6 pages.

(Continued)

*Primary Examiner* — M Baye Diao
(74) *Attorney, Agent, or Firm* — Erik Swanson; George S. Blasiak; Heslin Rothenberg Farley & Mesiti PC

(57) ABSTRACT

A computer-implemented method for prioritizing one or more electric vehicles that need a battery charge while driving. The method receives a wireless communication between one or more electric vehicles on a section of the roadway. The method further communicates a risk score between the one or more electric vehicles, based on a charging regulation model. The method further prioritizes a need for a battery charge, for the one or more electric vehicles on the section of the roadway, based on the communicated risk score. The method further engages one or more wireless charging points on the section of the roadway, with the one or more electric vehicles, based on the prioritized need for a battery charge.

20 Claims, 5 Drawing Sheets

(51) Int. Cl.
*H04W 4/46* (2018.01)
*B60L 58/21* (2019.01)

(58) Field of Classification Search
CPC ......... B60L 53/66; B60L 53/67; B60L 55/00;
H04W 4/46; H04W 4/44; Y02T 10/70;
Y02T 10/7072; Y02T 90/14; Y02T 90/16
USPC ........................................................ 320/108
See application file for complete search history.

(56) References Cited

U.S. PATENT DOCUMENTS

| | | | |
|---|---|---|---|
| 9,778,653 | B1 | 10/2017 | Mcclintock |
| 9,975,446 | B2 * | 5/2018 | Weber ..................... B60L 53/66 |
| 10,065,517 | B1 | 9/2018 | Konrardy |
| 10,860,621 | B1 * | 12/2020 | Ross ....................... G16H 40/63 |
| 10,932,135 | B2 * | 2/2021 | Han ..................... H04W 12/122 |
| 11,002,557 | B2 * | 5/2021 | Pedersen ............... G05D 1/0285 |
| 11,074,773 | B1 * | 7/2021 | Morris ................... B60L 53/66 |
| 11,092,452 | B2 * | 8/2021 | Jones ................ B60W 60/0015 |
| 2015/0306970 | A1 * | 10/2015 | Son .......................... B60L 58/12 701/22 |
| 2017/0259681 | A1 | 9/2017 | Anglin |
| 2018/0189683 | A1 * | 7/2018 | Newman ............ G01C 21/3605 |
| 2018/0254643 | A1 * | 9/2018 | Paluszek ................. B60L 53/68 |
| 2019/0263271 | A1 * | 8/2019 | Ashby .................... G06Q 50/06 |
| 2020/0269719 | A1 * | 8/2020 | Aykol .................... G06N 20/00 |
| 2020/0376969 | A1 * | 12/2020 | Shorten .................. B60L 53/16 |
| 2020/0413264 | A1 * | 12/2020 | Han ...................... H04W 12/68 |
| 2021/0107372 | A1 * | 4/2021 | Viswanathan .......... B60L 53/62 |
| 2021/0162874 | A1 * | 6/2021 | Lee ....................... H02J 7/0045 |
| 2021/0180967 | A1 * | 6/2021 | Chae .................. G01C 21/3415 |
| 2021/0240691 | A1 * | 8/2021 | Bertoni Scarton ... G06F 40/247 |
| 2021/0261015 | A1 * | 8/2021 | Wang ...................... B60L 53/63 |
| 2021/0347276 | A1 * | 11/2021 | Lu .......................... B60L 53/665 |

FOREIGN PATENT DOCUMENTS

| | | | | |
|---|---|---|---|---|
| EP | 3324251 | A1 * | 5/2018 | ............. B60L 58/12 |
| JP | 2020137412 | A * | 8/2020 | ............. B60L 50/60 |
| KR | 1020190071070 | | 6/2019 | |

OTHER PUBLICATIONS

Boeriu, "BMW Wireless Charging: 530e from 2018 with inductive charging", BMW Blog, Apr. 27, 2017, https://www.bmwblog.com/2017/04/27/bmw-wireless-charging-530e-2018-inductive-charging/, 10 pages.

Choi et al., "Advances in Wireless Power Transfer Systems for Roadway-Powered Electric Vehicles", IEEE Journal of Emerging and Selected Topics in Power Electronics, vol. 3, No. 1, Mar. 2015, p. 18-36.

Guo et al., "Rapid-Charging Navigation of Electric Vehicles based on Real-Time Power Systems and Traffic Data", IEEE Transactions on Smart Grid, vol. 5, No. 4, Jul. 2014, p. 1969-1979.

Mell et al., "The NIST Definition of Cloud Computing", National Institute of Standards and Technology, Special Publication 800-145, Sep. 2011, 7 pages.

Qualcomm, "Automotive", Smart Cars, Car Connectivity, Retrieved from https://www.qualcomm.com/solutions/automotive on Mar. 4, 2020, 11 pages.

Panchal et al., "Review of static and dynamic wireless electric vehicle charging system", Engineering Science and Technology, an International Journal 21 (2018) 922-937.

* cited by examiner

PRIORITIZATION FOR CHARGING ELECTRIC VEHICLES WHILE DRIVING ON THE ROAD

BACKGROUND

The present disclosure relates generally to the field of cognitive computing, Internet of Things (IoT), and more particularly to data processing and dynamic adjustment of engaging electric vehicles with electric roadways, while driving.

The global electric vehicle market value is projected to reach $567,300 million by 2025. Currently, electric vehicles are powered either by a collector system through electricity from charging station deployments or can be charged by self-charging devices such as regenerative braking systems, turbochargers, and others. There are additionally pilot projects on a limited number of roadways that allow communication between electric vehicles and the power grid. These pilot projects will allow communication between electric vehicles and the power grid, while the electric vehicles are on a roadway.

SUMMARY

Embodiments of the present invention disclose a method, a computer program product, and a system.

A method, according to an embodiment of the invention, in a data processing system including a processor and a memory, for prioritizing one or more electric vehicles (EVs) that need a battery charge while driving. The method includes receiving a wireless communication between one or more EVs on a section of the roadway. The method further includes communicating a risk score between the one or more EVs, based on a charging regulation model, and prioritizing a need for a battery charge, for the one or more EVs on the section of the roadway, based on the communicated risk score. The method further includes engaging one or more wireless charging points on the section of the roadway, with the one or more EVs, based on the prioritized need for a battery charge.

A computer program product, according to an embodiment of the invention, includes a non-transitory tangible storage device having program code embodied therewith. The program code is executable by a processor of a computer to perform a method. The method includes receiving a wireless communication between one or more EVs on a section of the roadway. The method further includes communicating a risk score between the one or more EVs, based on a charging regulation model, and prioritizing a need for a battery charge, for the one or more EVs on the section of the roadway, based on the communicated risk score. The method further includes engaging one or more wireless charging points on the section of the roadway, with the one or more EVs, based on the prioritized need for a battery charge.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes receiving a wireless communication between one or more EVs on a section of the roadway. The method further includes communicating a risk score between the one or more EVs, based on a charging regulation model, and prioritizing a need for a battery charge, for the one or more EVs on the section of the roadway, based on the communicated risk score. The method further includes engaging one or more wireless charging points on the section of the roadway, with the one or more EVs, based on the prioritized need for a battery charge.

DETAILED DESCRIPTION

The current wireless charging technology on electric roadways utilizes a magnetic field to charge electric vehicles. The development of wireless charging of electric vehicles on the roadway will lead to new problems. For example, the activation of the wireless chargers for each electric vehicle on the roadway will put huge pressure on the electric grid during traffic congestion. Currently, there is a lack of charging regulation for the electric chargers. As such, traffic congestion will potentially lead to constant wireless charging of all electric vehicles on the roadway, as they sit idle. As such, a prioritization of which EVs will receive a battery charge, and which ones will not, is a problem that this disclosure seeks to resolve.

The present disclosure discloses a method to prioritize one or more EVs that need a battery charge while driving, or idling in traffic. The present disclosure discloses communicating a risk score between one or more EVs on a roadway, via a wireless communication network. The method compares data metrics of the one or more EVs on the roadway with each other, and prioritizes the EVs in need of a battery charge based on the compared data metrics.

Hereinafter, exemplary embodiments of the present disclosure will be described in detail with reference to the attached drawings.

The present disclosure is not limited to the exemplary embodiments below, but may be implemented with various modifications within the scope of the present disclosure. In addition, the drawings used herein are for purposes of illustration, and may not show actual dimensions.

Figure 1:
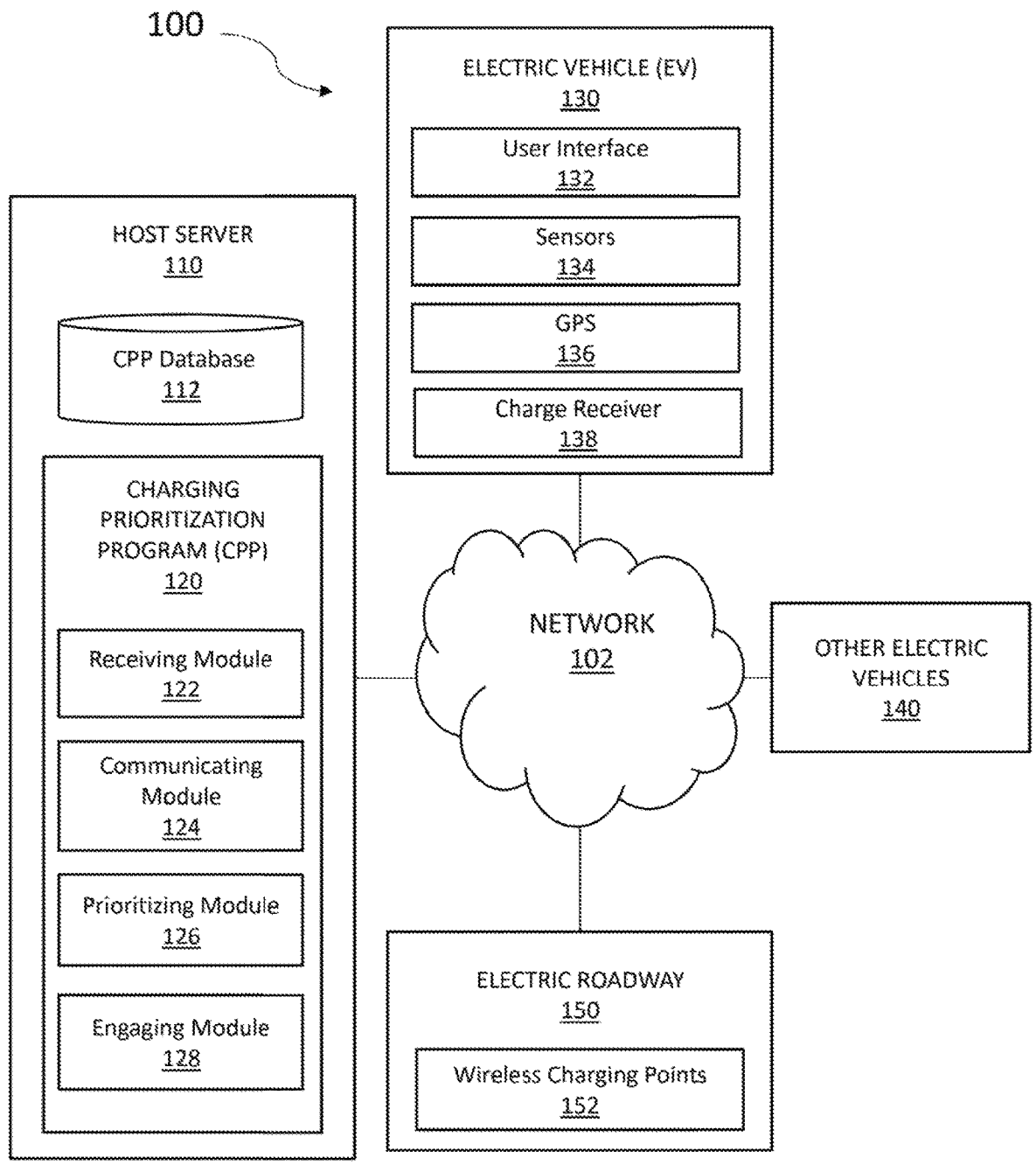
FIG. 1 illustrates an electric vehicle (EV) charging prioritization computing environment, in accordance with an embodiment of the present disclosure.

FIG. 1 illustrates an EV charging prioritization computing environment 100, in accordance with an embodiment of the present disclosure. EV charging prioritization computing environment 100 includes host server 110, electric vehicle (EV) 130, other electric vehicles 140, and electric roadway 150 all connected via network 102. The setup in FIG. 1 represents an example embodiment configuration for the present disclosure, and is not limited to the depicted setup in order to derive benefit from the present disclosure.

In an exemplary embodiment, host server 110 includes charging prioritization program (CPP) database 112 and charging prioritization program (CPP) 120. In various embodiments, host server 110 may be a laptop computer, tablet computer, netbook computer, personal computer (PC), a desktop computer, a personal digital assistant (PDA), a smart phone, a server, or any programmable electronic device capable of communicating with electric vehicle 130, other electric vehicles 140, and electric roadway 150 via network 102. Host server 110 may include internal and external hardware components, as depicted and described in further detail below with reference to FIG. 3. In other embodiments, host server 110 may be implemented in a cloud computing environment, as described in relation to FIGS. 4 and 5, herein. Host server 110 may also have wireless connectivity capabilities allowing the host server 110 to communicate with electric vehicle 130, other electric vehicles 140, electric roadway 150, and other computers or servers over network 102.

In exemplary embodiments, charging prioritization program (CPP) database 112 may contain one or more sets of data, mapped to a database table, corresponding to collected battery level data of EV 130 and/or other electric vehicles 140, an amount of time until the battery of EV 130 and/or other electric vehicles 140 is in critical need of a charge, a number of miles that EV 130 and/or other electric vehicles 140 can drive (without traffic) until the battery needs to be charged, an amount of time that EV 130 and/or other electric vehicles 140 idles in traffic until the battery needs to be charged, preferences of a user of EV 130 and/or other electric vehicles 140 for when the battery needs to be charged, and so forth.

While CPP database 112 is depicted as being stored on host server 110, in other embodiments, CPP database 112 may be stored on EV 130, other electric vehicles 140, charging prioritization program 120, or any other device or database connected via network 102, as a separate database. In alternative embodiments, CPP database 112 may be comprised of a cluster or plurality of computing devices, working together or working separately.

With continued reference to FIG. 1, electric vehicle 130 includes user interface 132, sensors 134, global positioning system (GPS) 136, and charge receiver 138. In exemplary embodiments, electric vehicle 130 may include, but is not limited to, a car, a minivan, a truck, a tractor-trailer, a train, or any road vehicle.

In an exemplary embodiment, EV 130 includes user interface 132 which may be a computer program that allows a user to interact with EV 130, other electric vehicles 140, and other connected devices via network 102. For example, user interface 132 may be a graphical user interface (GUI). In addition to comprising a computer program, user interface 132 may be connectively coupled to hardware components, such as those depicted in FIG. 3, for sending and receiving data. In an exemplary embodiment, user interface 132 may be a web browser, however in other embodiments user interface 132 may be a different program capable of receiving user interaction and communicating with other devices, such as host server 110.

In exemplary embodiments, user interface 132 may be presented on a touch screen display, a remote operated display, or a display that receives input form a physical keyboard or touchpad located within EV 130, such as on the dashboard, console, etc. In alternative embodiments, user interface 132 may be operated via voice commands, Bluetooth® (Bluetooth and all Bluetooth-based trademarks and logos are trademarks or registered trademarks of Bluetooth SIG, Inc. and/or its affiliates), a mobile device that connects to EV 130, or by any other means known to one of ordinary skill in the art. In exemplary embodiments, a user may interact with user interface 132 to transmit (or receive) a message, wherein the message is in the form of audio data, video data, image data, text data, and so forth. In various embodiments, a user may interact with user interface 132 to provide user feedback to charging prioritization model program 120, via network 102.

In alternative embodiments, a user of the EV 130 may be capable of conveying the battery level, the destination, the current position, and the predicted arrival time to the destination via user interface 132.

In exemplary embodiments, EV 130 includes one or more sensors 134. Sensors 134 may be a device, hardware component, module, or subsystem capable of recording, capturing, and detecting events or changes in EV 130, charging regulation computing environment 100, or proximity, and sending the detected data to other electronics (e.g., host server 110), components (e.g., CPP database 112), vehicles (e.g., other electric vehicles 140) or programs (e.g., charging prioritization program 120) within a system (e.g., charging prioritization computing environment 100). In various embodiments, the detected data collected by sensors 134 may be instrumental in providing feedback to (e.g., a second electronic vehicle, charging prioritization program 120), or to electric roadway 150.

Sensors 134, in exemplary embodiments, may be located within electric vehicle 130 and may be a global positioning system (GPS), software application, proximity sensor, camera, microphone, light sensor, infrared sensor, weight sensor, magnetic ring sensor, temperature sensor, tactile sensor, motion detector, optical character recognition (OCR) sensor, occupancy sensor, heat sensor, analog sensor (e.g., potentiometers, force-sensing resistors), radar, radio frequency sensor, quick response (QR) code, video camera, digital camera, Internet of Things (IoT) sensors, lasers, gyroscopes, accelerometers, actuators, structured light systems, tracking sensors, and other devices used for measuring, detecting, recording an environment or current state of the EV 130 and/or components/systems of the EV 130, as well as other electric vehicles 140 within a measured proximity of EV 130.

In exemplary embodiments, sensors 134 are capable of continuously monitoring, collecting, and saving collected data on a local storage or storage on a separate server (e.g., CPP database 112), or alternatively sending the collected data, or various selected pieces of the collected data, to charging prioritization program 120.

In exemplary embodiments, sensors 134 are capable of measuring various systems/components of EV 130 in real-time, such as battery level, proximity to other EVs 140 on a roadway, predicated arrival time to a destination, predicted route to get to a destination, whether the predicted route includes electric charging roadways, predicted traffic congestion along the route, and so forth.

In alternative embodiments, sensors 134 may be capable of detecting, communicating, pairing, or syncing with internet of things (IoT) devices, thus creating opportunities for more direct integration of the physical world into computer-based systems, and resulting in improved efficiency, accuracy, and economic benefit in addition to reduced human intervention.

In various embodiments, sensors 134 are embedded within EV 130 that contain a computer processing unit (CPU), memory, and power resource, and may be capable of communicating with EV 130, other EVs 140, electric roadway 150, and host server 110 over network 102.

In exemplary embodiments, sensors 134 continually monitor the components of EV 130 (e.g., battery level) and transmit various portions of the collected data (e.g., battery level) to other electric vehicles 140 within a pre-determined proximity of EV 130, and to charging prioritization program 120.

In exemplary embodiments, global positioning system (GPS) 136 is a computer program on EV 130 that provides time and location information for a vehicle. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In the exemplary embodiment, GPS 136 is capable of providing real-time location detection of EV 130, together with an estimated time of arrival for a given destination based on real-time traffic, weather conditions, and so forth. GPS 136 may also include alternate routes to reach a destination. In exemplary embodiments. GPS 136 may direct EV 130 to a route that includes an electric roadway 150, based on results of charging prioritization program 120.

In exemplary embodiments, GPS 136 is located in EV 130 and may include real-time information regarding traffic, emergency happenings on a route (e.g., car accident, bridge collapse, fire, etc.) or public events (e.g., sporting events, concerts) that may affect estimated travel time information. In various embodiments, GPS 136 may provide alternate routes to reach a destination.

In an exemplary embodiment, EV 130 includes a charge receiver 138 which may be a magnetic coil located on the bottom of the EV 130. Using a technology called inductive charging, electricity is transferred through an air gap from one magnetic coil in the charger to a second magnetic coil fitted to the EV 130. For example, if a user parks an EV 130 in the right place so that the coils are aligned, then charging will begin. Likewise, if a user drives an EV 130 in the right place on an electric roadway, such as electric roadway 150, then the EV 130 will be charged when the magnetic coil of the EV 130 aligns with the magnetic coil of the electric roadway 150.

In exemplary embodiments, other electric vehicles 140 may include the same, or similar components as EV 130, such as a user interface 132, sensors 134. GPS 136, and charge receiver 138. In exemplary embodiments, other electric vehicles 140 may be capable of communicating with EV 130 via vehicle-to-vehicle (V2V) communication, vehicle-to-everything (V2X) communication, Wireless Fidelity (WiFi), and Radio Frequency Identification (RFID), or by any other means known to one of ordinary skill in the art. Additionally, other electric vehicles 140 may be capable of communicating with host server 110, charging prioritization program 120, EV 130, and electric roadway 150, via network 102.

In exemplary embodiments, electric roadway 150 is a road that may include wireless charging points 152 that supply electric power to EVs 130 and other electric vehicles 140 while driving. In various embodiments, electric roadway 150 is implemented via a ground-level power supply through conductive rails or inductive coils embedded in the road. In further embodiments, electric roadway 150 allows for public charging of EV 130 and other electric vehicles 140, for example, through power metering and commensurate billing based on use. In various embodiments, wireless charging points 152 may include conductive rails or inductive coils that may be engaged or dis-engaged from charging an EV 130 and other electric vehicles 140, based on necessity and prioritization, as determined by charging prioritization program 120.

In further exemplary embodiments, electric roadway 150 includes wireless charging technology that utilizes a magnetic field to charge EVs 130 and other electric vehicles 140. The magnetic field does not transfer electricity from the power station to the car. Instead, the magnetic field aims to activate the magnetic resonator, or ring, in order to generate electricity from the generator inside of the FV 130. As a consequence of the activation of the chargers for each of the EVs that are on the road, there will be a lot of pressure on the electric grid during traffic congestion. As a result, CPP 120 is a novel way to prioritize charging of EVs that do not necessitate a charge, thereby possibly alleviating a power grid surge.

With continued reference to FIG. 1, charging prioritization program 120, in an exemplary embodiment, may be a computer application on host server 110

With continued reference to FIG. 1, charging prioritization program 120, in an exemplary embodiment, may be a computer application on host server 110 that contains instruction sets, executable by a processor, that prioritizes whether one or more EVs, on a section of the roadway 150, need a current battery charge. The instruction sets may be described using a set of functional modules. In exemplary embodiments, charging prioritization program 120 may receive input from EV 130, as well as other EVs 140 on electric roadway 150, via network 102. In alternative embodiments, charging prioritization program 120 may be a computer application contained within an EV, or a stand-alone program on a separate electronic device.

With continued reference to FIG. 1, the functional modules of charging prioritization program 120 include receiving module 122, communicating module 124, prioritizing module 126, and engaging module 128.

Figure 2:
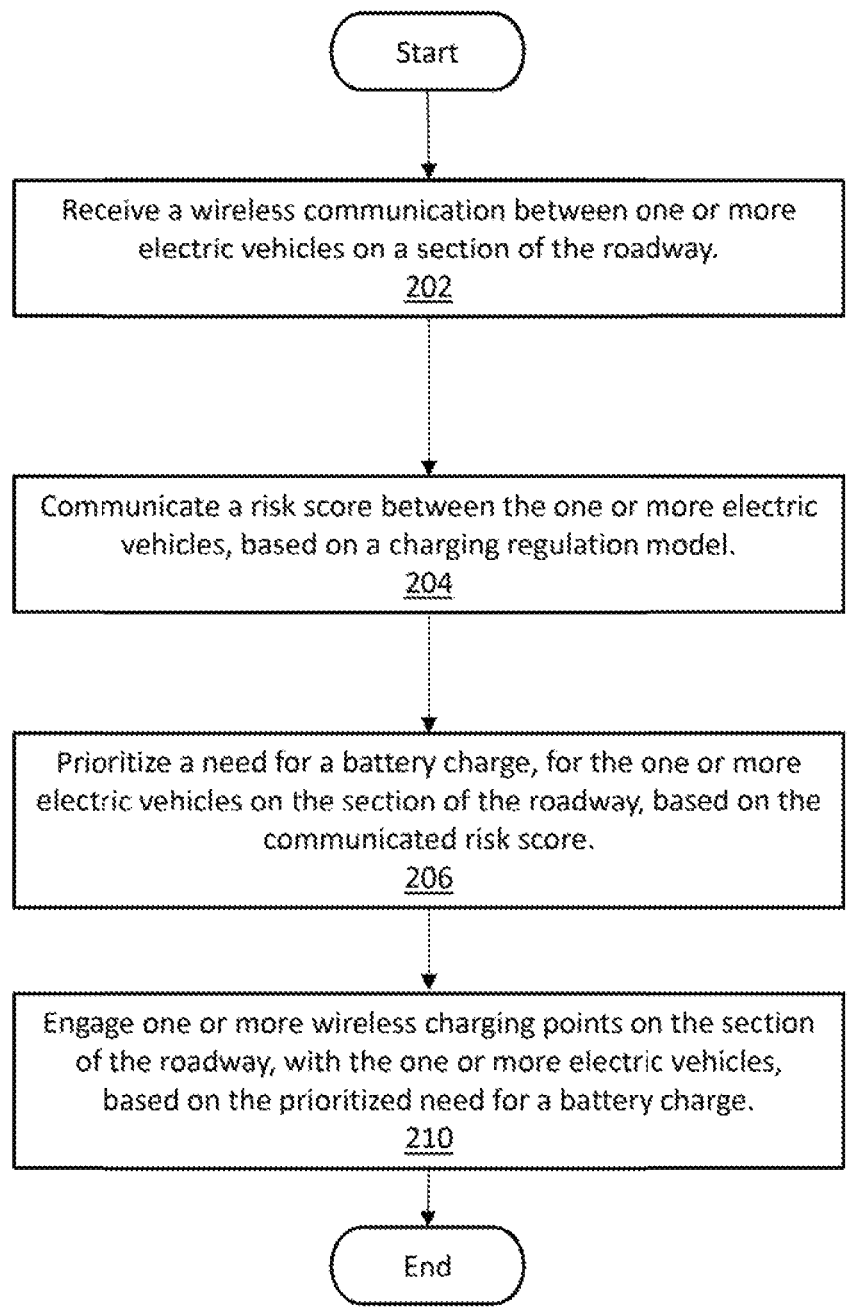
FIG. 2 is a flowchart illustrating the operation of a charging prioritization program of FIG. 1, in accordance with an embodiment of the present disclosure.

FIG. 2 is a flowchart illustrating the operation of charging prioritization program 120 of FIG. 1, in accordance with embodiments of the present disclosure.

With reference to FIGS. 1 and 2, receiving module 122 includes a set of programming instructions in charging prioritization program 120, to receive a wireless communication between one or more EVs on a section of a roadway (step 202). The set of programming instructions is executable by a processor.

In exemplary embodiments, receiving module 122 enables one or more EVs to communicate with each other on a roadway. Examples of information that may be communicated between one or more EVs on the roadway include, but are not limited to: a battery level, a destination, a current position in relation to the destination, and a predicted arrival time to reach the destination.

In exemplary embodiments, a battery level indicates the amount of charge remaining in the battery of an EV. For example, the battery level may indicate a percentage of battery charge remaining (i.e., 25%, 50%, 75%, etc.), an amount of time until the battery of EV 130 is at a 0% charge (e.g., 20 minutes, 1 hour, 3 hours, etc.), or any other metric, known to one of ordinary skill in the art, that is capable of communicating the amount of charge remaining in the battery of an EV.

In exemplary embodiments, a destination is input by a user of the EV 130 into a mapping application in order to determine a route to the destination. Via CPS 136, the mapping application is capable of further depicting a current position of EV 130, a predicated arrival time of EV 130 to the destination, and any other information that is commonly conveyed to a user of an EV 130 while driving (e.g., traffic congestion, accidents, police, and so forth).

In exemplary embodiments, the wireless communication is via a V2X communication framework. In alternative embodiments, that wireless communication between EV 130 and other EVs 140 may be via a V2V communication framework, or any other wireless communication framework known to one of ordinary skill in the art.

With reference to an illustrative example, Joe is driving his EV 130 to pick up his kids from school. Joe forgot to charge his EV 130 battery last night but he has taken the drive to school with a 30% battery charge before and he never had a problem. While Joe is driving along his route, receiving module 122 receives data metrics of other EVs 140 along the roadway that are within a close proximity to Joe, and who may require a battery charge along the section of the electric roadway 150.

With continued reference to FIGS. 1 and 2, communicating module 124 includes a set of programming instructions in charging prioritization program 120 to communicate a risk score between the one or more EVs, based on a charging regulation model (step 204). The set of programming instructions are executable by a processor.

In exemplary embodiments, a charging regulation model for EVs is constructed based on an analyzed set of EV data, which may include a battery level, a destination and a predicted arrival time.

In exemplary embodiments, the charging regulation model is a logic regression model. A logic regression model uses a binary classifier system (e.g., yes charge/no charge). In alternative embodiments, the charging regulation models may be a multi-classifier system (e.g., if yes charge, how much?) In further alternative embodiments, the charging regulation model may be any kind of classification system/ algorithm, known to one of ordinary skill in the art.

In exemplary embodiments, the logic regression model (or any other model being used) is used to decide whether or not an EV 130 requires, at a specific point in time, a battery charging via the wireless charging points 152 along the electric roadway 150.

In exemplary embodiments, the charging regulation model may further include predicting traffic congestion for the FV 130 to reach the destination, and calculating a minimum amount of battery charge required for the IN 130 to reach the destination, based on the predicted traffic congestion.

In exemplary embodiments, a charging regulation model may calculate the minimum amount of battery charge needed for the EV 130 to reach the destination based on battery performance history (e.g., battery charge loss rate per minute, or any other similar metric), a current battery charge level, and an estimated time required to reach the destination.

Furthermore, the charging regulation model computes a risk score pertaining to charging the EV 130, based on the constructed charging regulation model for the EV 130.

In exemplary embodiments, the risk score may be determined by receiving a current battery charge level for the one or more EVs on the roadway, obtaining predicted traffic congestion, for the one or more EVs, to reach a respective destination, and determining a minimum battery charge level needed for the one or more EVs to reach the respective destination, based on the predicted traffic congestion.

In alternative embodiments, charging prioritization program 120 may be capable of re-routing one or more EVs to their respective destination, based on predicted traffic congestion as well as the determined minimum battery charge level needed for the one or more EVs to reach their respective destinations.

Referring back to the illustrative example above, communicating module 124 communicates the risk score of Joe's EV 130 with the other EVs 140 on the roadway. In the same vein, the other EVs 140 communicate their respective risk scores, via communicating module 124, with Joe's EV 130. Joe's EV 130 requires a minimum battery charge of 15% to reach his kids' school, and another 15% battery charge to return back home. Since Joe's EV's 130 current battery charge is 30%, he should have sufficient battery charge to make the round trip and then charge his EV 130 in his garage upon returning home. However, Joe encounters some traffic congestion on the way to his kids' school. The unexpected time idling in traffic will drain Joe's EV's 130 battery by an extra 10%, according to computing module 126. This unexpected extra drain will put Joe in a vulnerable situation of his EV 130 becoming battery-drained out on the side of the road. As such, the amount of time for Joe to reach his kids' school exceeds the current battery charge level, thus placing Joe's computed risk score above a threshold value. Communication module 124 further communicates the computed risk scores for the other EVs 140 that are above a threshold value, too.

With continued reference to FIGS. 1 and 2, prioritizing module 126 includes a set of programming instructions in charging prioritization program 120 to prioritize a need for a battery charge, for the one or more EVs on the section of the roadway, based on the communicated risk score (step 206). The set of programming instructions are executable by a processor.

In exemplary embodiments, prioritizing the need for a battery charge, for the one or more EVs on the section of the roadway, may further include sharing one or more data metrics between the one or more EVs driving on the section of the roadway, and comparing the shared one or more data metrics between the one or more EVs driving on the section of the roadway. Prioritizing module 126 may further include ranking the one or more EVs that need a battery charge, based on the comparison.

In exemplary embodiments, one or more shared data metrics may include, but are not limited to: a battery level, a destination, a predicted traffic congestion along the route, a risk score, and user preferences.

Referring back to the illustrative example above, prioritizing module 126 prioritizes Joe's EV 130 as needing a battery charge, prior to any of the other EVs 140 on the section of the roadway 150, based on the communicated risk scores between all of the other EVs on the same section of the roadway 150 as Joe.

With continued reference to FIGS. 1 and 2, engaging module 128 includes a set of programming instructions in charging prioritization program 120, to engage one or more wireless charging points on the section of the roadway, with the one or more EVs, based on the prioritized need for a battery charge (step 208). The set of programming instructions is executable by a processor.

In exemplary embodiments, if it is determined that the EV 130 requires a current charge (e.g., the computed risk score is above a threshold value), then charging prioritization program 120 may determine how much additional battery charge is required to reach the destination, based on the computed risk score.

In exemplary embodiments, charging prioritization program 120 may be capable of determining a maximum amount of charging capacity, for a section of a roadway, at a given time. Charging prioritization program 120 may further be capable of limiting a number of EVs that are engaged with one or more wireless charging points 152 at a given time, based on the determined maximum amount of charging capacity available.

In exemplary embodiments, charging prioritization program 120 may be capable of determining an alternative destination for the EN 130, and other EVs 140 based on respective current battery charge levels. For example, an alternative destination may include a nearby charging station within a threshold vicinity of the EV 130.

In further alternative embodiments, charging prioritization program 120 may further determine one or more loss metrics over time based on training and feedback from a user of the EV 130.

In further exemplary embodiments, engaging module 128 may engage one or more wireless charging points 152, along the section of the electric roadway 150, for a prioritized set of EVs, wherein the prioritized set of EVs require a current battery charge.

Likewise, engaging module 128 may disengage the one or more wireless charging points 152, along the section of the electric roadway 150, for an alternate set of EVs, wherein the alternate set of EVs can obtain a battery charge along the determined one or more alternate roadways.

In exemplary embodiments, engaging module 128 may disable the one or more wireless charging points 152 on a roadway (e.g., electric roadway 150), if the computed risk score for the EV 130 is equal to or exceeds a threshold value.

Referring back to the illustrative example above, engaging module 128 engages with Joe's EV 130, together with higher ranked (or prioritized) other EVs 140 on the same section of the electric roadway 150 as Joe, in order to provide a battery charge to the EVs on the roadway that need it most. For example, engaging module 128 engages the one or more wireless charging points 152 in order to charge Joe's EV 130 battery an additional 15% while he is driving. Engaging module 128 disengages the wireless charging points 152 with Joe's EV 130 when the 15% battery charge increase is detected. In this way, other electric vehicles 140 on the roadway that also need charging, to avoid stalling out on the road, will be able to receive a "safety" charge boost without over-stressing the electric power grid.

Further, engaging module 128 engages with Joe's EV 130 as well as the other EVs 140 based on the charging capacity of the electric power grid on the electric roadway 150 at the given point in time.

In exemplary embodiments, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth®, network, a WiFi network, a vehicle-to-vehicle (V2V) network, a vehicle-to-infrastructure (V2I) network, a peer-to-peer (P2P) communication network, a mesh network, or a combination thereof. In general, network 102 can be any combination of connections and protocols that will support communications between host server 110, electric vehicle 130, other electric vehicles 140, and roadway 150.

Figure 3:
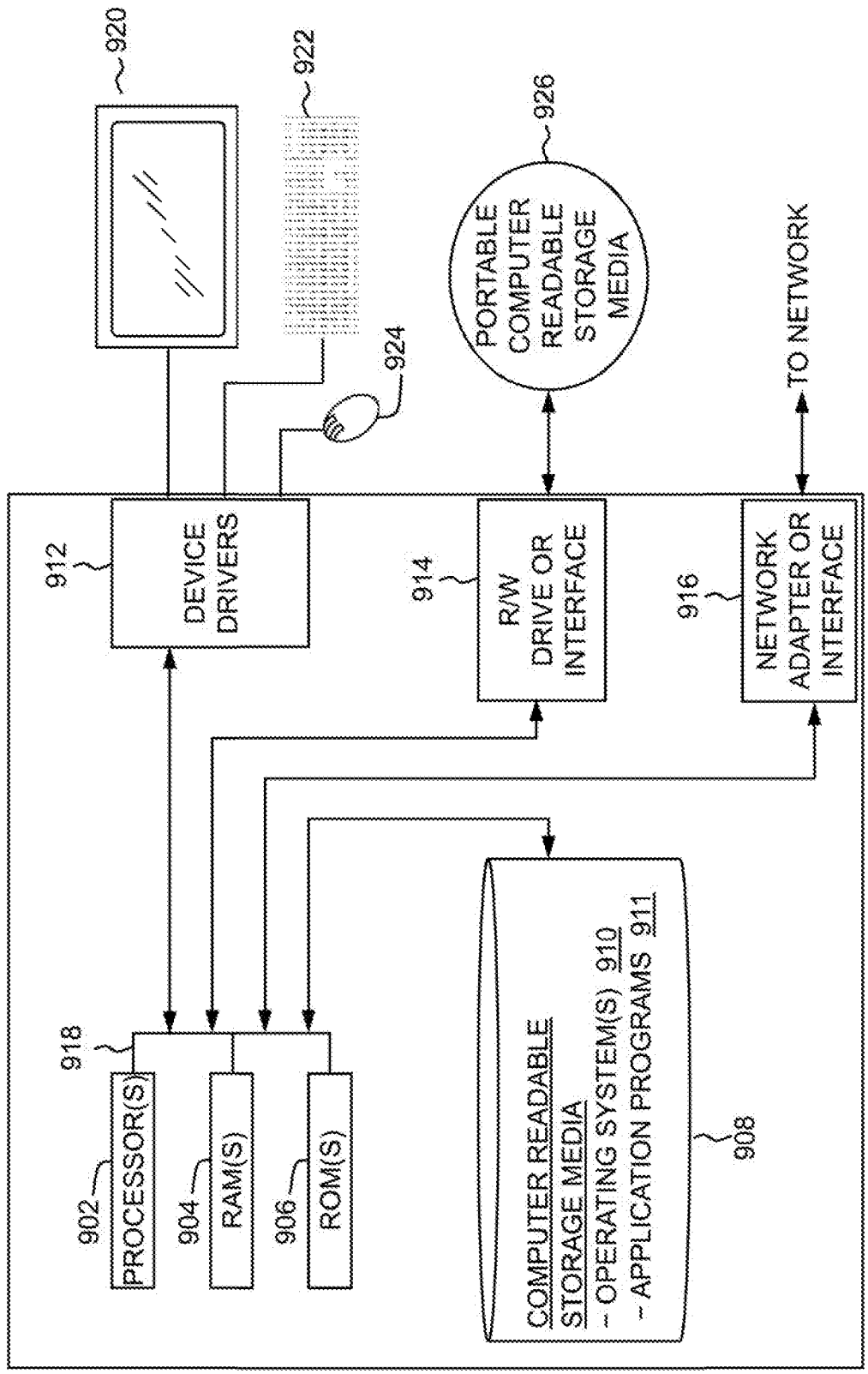
FIG. 3 is a diagram graphically illustrating the hardware components of the EV charging prioritization computing environment of FIG. 1, in accordance with an embodiment of the present disclosure.

FIG. 3 is a block diagram depicting components of a computing device (such as host server 110, as shown in FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as charging prioritization program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive. CD-ROM, DVD, memory stick, magnetic tape, magnetic disk, optical disk, a semiconductor storage device such as RAM. ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device of FIG. 3 may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
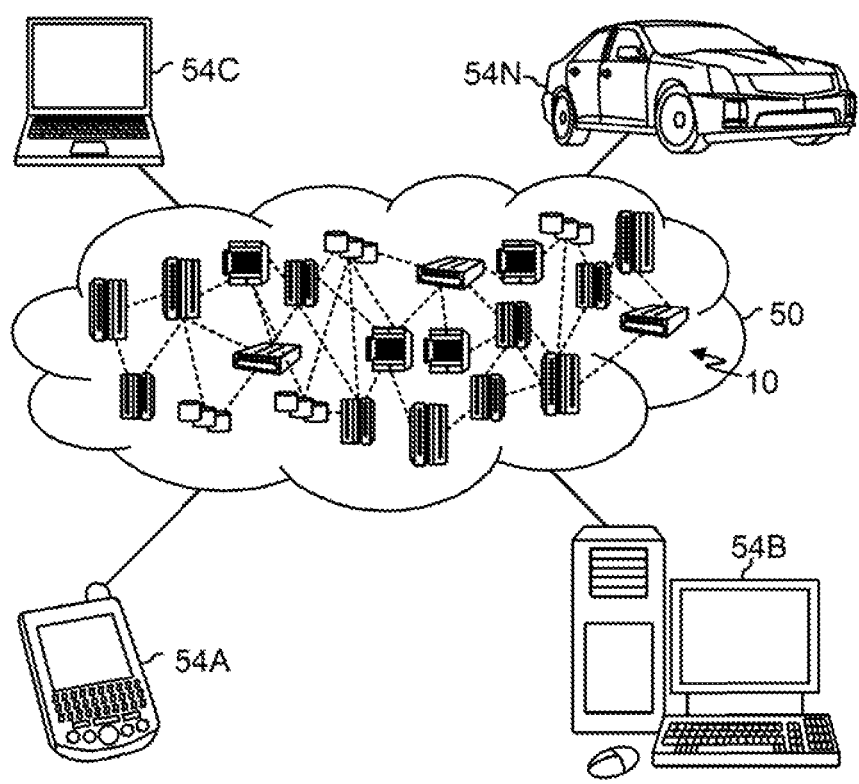
FIG. 4 depicts a cloud computing environment, in accordance with an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
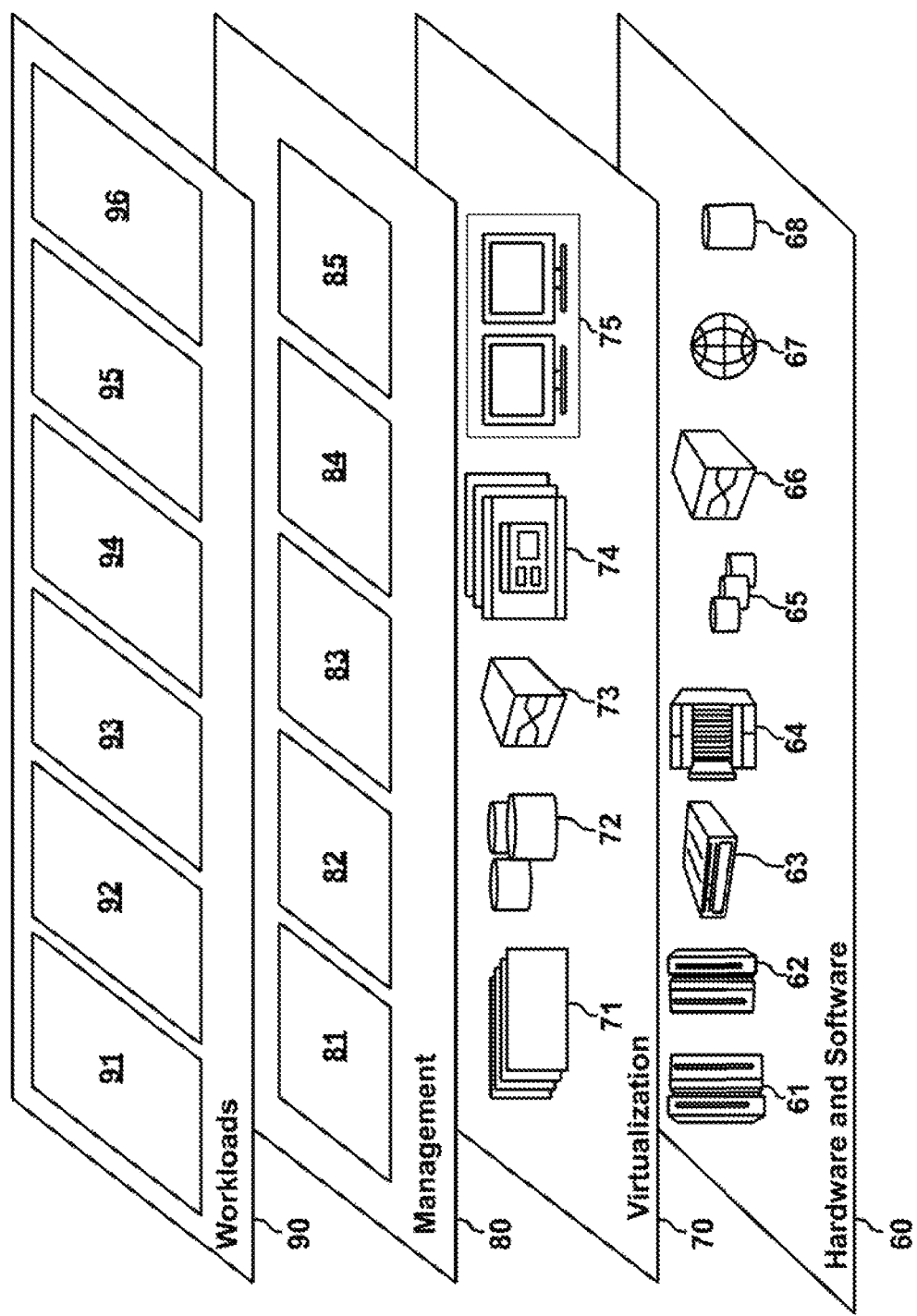
FIG. 5 depicts abstraction model layers of the illustrative cloud computing environment of FIG. 4, in accordance with an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and EV charging regulation 96. EV charging regulation 96 may relate to determining whether an EV requires a current battery charge on a roadway.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for prioritizing one or more electric vehicles (EVs) that need a battery charge while driving, the method comprising:
   receiving a wireless communication between one or more EVs on a section of a roadway;
   communicating a risk score between the one or more EVs, based on a charging regulation model;
   prioritizing a need for a battery charge, for the one or more EVs on the section of the roadway, based on the communicated risk score; and
   engaging one or more wireless charging points on the section of the roadway, with the one or more EVs, based on the prioritized need for a battery charge.

2. The computer-implemented method of claim 1, wherein the wireless communication is via a vehicle-to-everything (V2X) communication framework.

3. The computer-implemented method of claim 2, wherein prioritizing the need for a battery charge, for the one or more EVs on the section of the roadway, further comprises:
   sharing one or more data metrics between the one or more EVs driving on the section of the roadway;
   comparing the shared one or more data metrics between the one or more EVs driving on the section of the roadway; and
   ranking the one or more EVs that need a battery charge, based on the comparison.

4. The computer-implemented method of claim 1, wherein the risk score is determined by:
   receiving a current battery charge level for the one or more EVs;
   obtaining predicted traffic congestion, for the one or more EVs, to reach a respective destination; and
   determining a minimum battery charge level needed for the one or more EVs to reach the respective destination, based on the predicted traffic congestion.

5. The computer-implemented method of claim 4, further comprising:
   re-routing the one or more EVs to the respective destination, based on predicted traffic congestion and the determined minimum battery charge level needed for the one or more EVs to reach the respective destination.

6. The computer-implemented method of claim 1, further comprising:
   determining one or more alternate roadways, for the one or more EVs, that are along a route to the respective destination;
   engaging one or more wireless charging points, along the section of the roadway, for a prioritized set of EVs, wherein the prioritized set of EVs require a current battery charge; and
   disengaging the one or more wireless charging points, along the section of the roadway, for an alternate set of EVs, wherein the alternate set of EVs can obtain a battery charge along the determined one or more alternate roadways.

7. The computer-implemented method of claim 6, further comprising:
   determining a maximum amount of charging capacity, for a section of the roadway, at a given time; and
   limiting a number of electric vehicles that are engaged with one or more wireless charging points at any given time, based on the determined maximum amount of charging capacity available.

8. A computer program product, comprising a non-transitory tangible storage device having program code embodied therewith, the program code executable by a processor of a computer to perform a method, the method comprising:
   receiving a wireless communication between one or more electric vehicles (EVs) on a section of a roadway;
   communicating a risk score between the one or more EVs, based on a charging regulation model;
   prioritizing a need for a battery charge, for the one or more EVs on the section of the roadway, based on the communicated risk score; and engaging one or more wireless charging points on the section of the roadway, with the one or more EVs, based on the prioritized need for a battery charge.

9. The computer program product of claim 8, wherein the wireless communication is via a vehicle-to-everything (V2X) communication framework.

10. The computer program product of claim 9, wherein prioritizing the need for a battery charge, for the one or more EVs on the section of the roadway, further comprises:
   sharing one or more data metrics between the one or more EVs driving on the section of the roadway;
   comparing the shared one or more data metrics between the one or more EVs driving on the section of the roadway; and
   ranking the one or more EVs that need a battery charge, based on the comparison.

11. The computer program product of claim 8, wherein the risk score is determined by:
   receiving a current battery charge level for the one or more EVs;
   obtaining predicted traffic congestion, for the one or more EVs, to reach a respective destination; and
   determining a minimum battery charge level needed for the one or more EVs to reach the respective destination, based on the predicted traffic congestion.

12. The computer program product of claim 11, further comprising:
   re-routing the one or more EVs to the respective destination, based on predicted traffic congestion and the determined minimum battery charge level needed for the one or more EVs to reach the respective destination.

13. The computer program product of claim 8, further comprising:
   determining one or more alternate roadways, for the one or more EVs, that are along a route to the respective destination;
   engaging one or more wireless charging points, along the section of the roadway, for a prioritized set of EVs, wherein the prioritized set of EVs require a current battery charge; and
   disengaging the one or more wireless charging points, along the section of the roadway, for an alternate set of EVs, wherein the alternate set of EVs can obtain a battery charge along the determined one or more alternate roadways.

14. The computer program product of claim 13, further comprising:
   determining a maximum amount of charging capacity, for a section of the roadway, at a given time; and
   limiting a number of electric vehicles that are engaged with one or more wireless charging points at any given time, based on the determined maximum amount of charging capacity available.

15. A computer system, comprising:
   one or more computer devices each having one or more processors and one or more tangible storage devices; and
   a program embodied on at least one of the one or more storage devices, the program having a plurality of program instructions for execution by the one or more processors, the program instructions comprising instructions for:
   receiving a wireless communication between one or more electric vehicles (EVs) on a section of a roadway;
   communicating a risk score between the one or more EVs, based on a charging regulation model;
   prioritizing a need for a battery charge, for the one or more EVs on the section of the roadway, based on the communicated risk score; and
   engaging one or more wireless charging points on the section of the roadway, with the one or more EVs, based on the prioritized need for a battery charge.

16. The computer system of claim 15, wherein the wireless communication is via a vehicle-to-everything (V2X) communication framework.

17. The computer system of claim 16, wherein prioritizing the need for a battery charge, for the one or more EVs on the section of the roadway, further comprises:
   sharing one or more data metrics between the one or more EVs driving on the section of the roadway;
   comparing the shared one or more data metrics between the one or more EVs driving on the section of the roadway; and
   ranking the one or more EVs that need a battery charge, based on the comparison.

18. The computer system of claim 15, wherein the risk score is determined by:
   receiving a current battery charge level for the one or more EVs;
   obtaining predicted traffic congestion, for the one or more EVs, to reach a respective destination; and
   determining a minimum battery charge level needed for the one or more EVs to reach the respective destination, based on the predicted traffic congestion.

19. The computer system of claim 18, further comprising:
   re-routing the one or more EVs to the respective destination, based on predicted traffic congestion and the determined minimum battery charge level needed for the one or more EVs to reach the respective destination.

20. The computer system of claim 15, further comprising:
   determining one or more alternate roadways, for the one or more EVs, that are along a route to the respective destination;
   engaging one or more wireless charging points, along the section of the roadway, for a prioritized set of EVs, wherein the prioritized set of EVs require a current battery charge; and
   disengaging the one or more wireless charging points, along the section of the roadway, for an alternate set of EVs, wherein the alternate set of EVs can obtain a battery charge along the determined one or more alternate roadways.

* * * * *